Nov. 16, 1965  E. P. WARNERY  3,217,517
CROSS-KEYED COUPLING DEVICE
Filed May 9, 1963  4 Sheets-Sheet 1

EDMOND P. WARNERY
INVENTOR

Karl F. Ross
AGENT

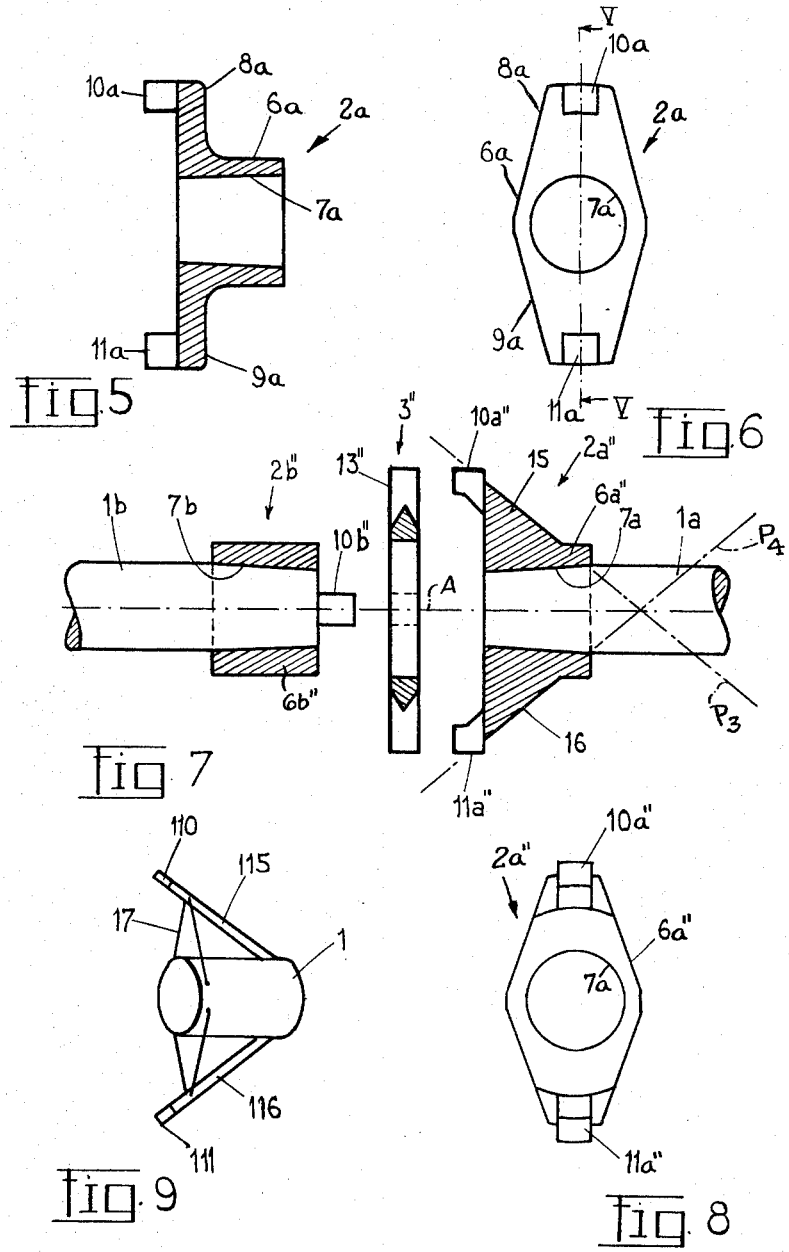

EDMOND P. WARNERY
INVENTOR

Karl G. Ross
AGENT

EDMOND P. WARNERY
INVENTOR

Karl J. Ross
AGENT

3,217,517
CROSS-KEYED COUPLING DEVICE
Edmond P. Warnery, Boulogne-sur-Seine, Seine, France, assignor to Compagnie Francaise Thomson-Houston, Paris, France, a corporation of France
Filed May 9, 1963, Ser. No. 279,067
Claims priority, application France, May 17, 1962, 897,843, Patent 1,333,786
8 Claims. (Cl. 64—31)

This invention relates to mechanical couplings serving to transmit torque between two substantially coaxial but not unvariably aligned shafts. More specifically the invention relates to the class of coupling devices known as Oldham's or cross-keyed couplings.

Oldham's couplings are well-known devices and have been used for many years in various fields of mechanical engineering. While minor modifications have been proposed at various times to the construction of Oldham's couplings, their broad features have remained unaltered. In my investigation of fast-response servo-mechanisms I have been confronted with problems in which the characteristics of conventional cross-keyed couplings for the transmission of torques with the desired high degree of linearity and absence of inertia lag and backlash have proved inadequate. It is accordingly an object of this invention to provide an improved form of cross-keyed coupling possessing considerably better performance characteristics than any of those hitherto available.

Specific objects are to provide a coupling device for the transmission of torque between substantially coaxial parallel shafts capable of disalignment, which will have extremely high rigidity, low inertia, and hence a very low response time; to provide such a coupling in which a major part or all of the mechanical components will be free of torsional stresses, inasmuch as I have found that the torsional forces to which the parts of the conventional Oldham's couplings are invariably exposed in operation, as will be later shown, are a chief cause of inefficient performance; and to provide such a coupling in which, in contrast with conventional couplings of this type, the structural components are stressed only in flexion, and/or in tension and compression; a further object is to provide a coupling of this character having an improved provision for torque limitation. Other objects will appear in the course of the description given herebelow.

In accordance with an important feature of the invention, an improved cross-keyed coupling between a pair of potentially disaligned, substantially coaxial shafts comprises a pair of side coupling members secured to the respective shafts for rotation therewith and a central coupling member intermediate said side members, said central member having four angularly equispaced notches formed in its periphery at the ends of respective diameters at right angles to each other, each of said side members having a pair of axially extending tenons positioned at the ends of a common diameter and engageable with a corresponding pair of diametrically opposed notches of said central member, to permit limited radial shifting between said central member and each of said side members during rotation of the shafts and thereby take up any disalignments therebetween as known per se.

Preferably the central member is in the form of a substantially flat rigid plate. Preferably also the side members are so contoured that they will transmit the forces from their end tenons to the respective shaft in straight lines at an angle to the shaft axis, as a consequence of which said side members will be stressed in flexion rather than in torsion as would otherwise be the case.

Exemplary embodiments of the invention will now be described for purposes of illustration but not of limitation with reference to the accompanying drawing, wherein:

FIG. 5 is an axial section of one of the side coupling members in the coupling of FIG. 2, taken on line V—V of FIG. 6;

FIG. 6 is a front view of the side coupling member shown in FIG. 5;

FIG. 7 is an exploded axial sectional view of a further coupling device according to another embodiment of the invention, generally similar to the device of FIG. 2 but with the side coupling members modified to eliminate torsional strains therein;

FIG. 8 is a front view of a side coupling member in the device of FIG. 7;

FIG. 9 is a diagrammatic view in perspective of a mechanical structure essentially equivalent to the structure of a side member of the coupling in FIG. 7, serving to illustrate more clearly the manner in which said side member is stressed;

FIG. 16 is another side view of the element shown in FIGS. 14 and 15, as seen on a plane of projection at right angles to the plane on which FIG. 15 is projected.

Figure 1:
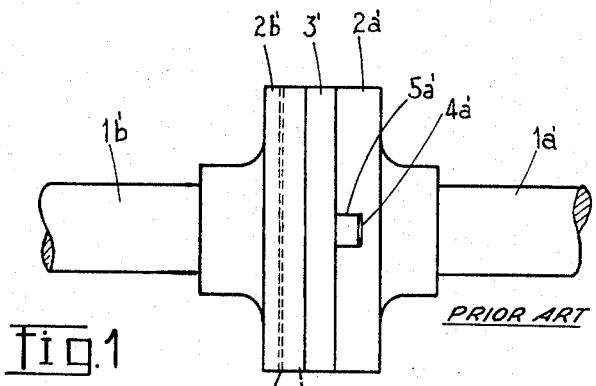
FIG. 1 is an elevational view of a conventional Oldham's or cross-keyed coupling presented herein for explanatory purposes.

The conventional Oldham's or cross-keyed coupling shown in FIGURE 1 interconnecting two shafts $1a'$ and $1b'$ comprises a pair of coupling halves or members $2a'$ and $2b'$ keyed on the respective shafts, and an intermediate or central coupling member $3'$. The two side coupling members $2a'$ and $2b'$ are identical, each comprising a disk-like flange across the face of which a straight diametric slot or keyway $4a'$, $4b'$ is cut. The central member $3'$ is in the form of a disk having two diametric keys or tongues $5a'$, $5b'$ projecting from its opposite faces in orthogonal relation to each other for slidable engagement in the respective keyways $4a'$, $4b'$. As is well known, such a coupling will transmit torque between the shafts $1a'$ and $1b'$ even though there may be some disalignment between them, provided the shafts remain parallel. This is a consequence of the fact that the intermediate member $3'$ is capable of some lateral reciprocation with respect to each of the side members $2a'$, $2b'$ during rotation of the shafts while still maintaining torque-transmitting relationship with both side members.

Figure 2:
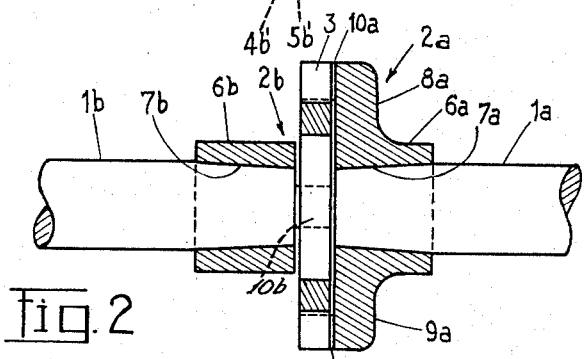
FIG. 2 is an axial sectional view of an improved coupling device according to a first embodiment of the invention.
Figures 3, 4:
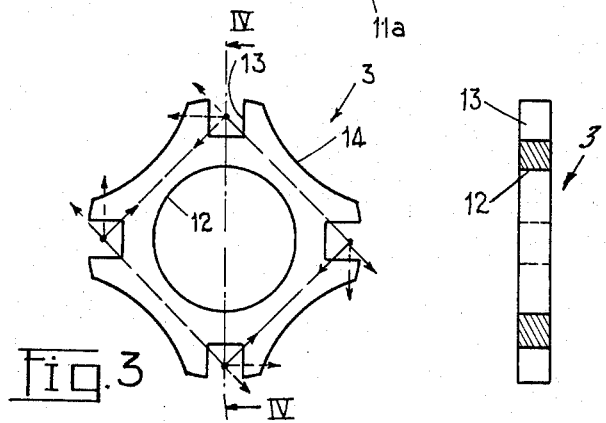
FIG. 3 is a front view of the central coupling member in a coupling device according to FIG. 2.
FIG. 4 is an axial section of the central coupling member taken on line IV—IV of FIG. 3.

FIGURE 2 illustrates an improved cross-keyed coupling according to one embodiment of the invention. The coupling interconnecting the two shafts 1a and 1b again includes two identical side coupling members 2a, 2b and a central coupling member 3. The central member 3 is illustrated separately in FIGS. 3 and 4 and one of the two side members 2a is separately shown in FIGS. 5 and 6. As concerns the construction of the side coupling members 2a and 2b, it will be seen that each of these members includes a hub part 6a, 6b formed with a frustoconical bore 7a, 7b for force-fitted engagement with a corresponding taper on the associated shaft extremity. Extending oppositely from the hub, as particularly illustrated for the hub 6a in FIGS. 5 and 6, are two radial arms 8a and 9a, which carry axially projecting tenons or keys 10a and 11a at their outer ends. The central coupling member 3 is a flat disk cut out somewhat in the shape of a Geneva cross. The member 3 has a central bore 12, and its outer periphery is formed with four outwardly open notches 13 positioned at 90° intervals from one another. The peripheral edges of the notches 13 are preferably interconnected by concave surfaces 14, as shown, for the purpose of reducing inertia. The notches 13 are dimensioned for sliding interengagement with the keys or tenons such as 10a and 11a, 11b of the side coupling members.

As will be seen upon a comparison of the improved structure just described with the conventional Oldham's coupling shown in FIG. 1, there are two significant modifications introduced in accordance with this invention.

The first is that the cross-keying between the central member 3 and the side members 2a and 2b, instead of being provided in the form of continuous keyways extending throughout full diameters of the coupling members as in the conventional structure, is herein limited to short radial portions at the outer ends of the crossed diameters of the coupling. It will be apparent that the operation of the improved coupling in taking up disalignment between the parallel shafts 1a and 1b will be the same as in the case of the conventional coupling of FIG. 1, the keys 10a and 11a of the side member 2a effecting slight radial shifting movements in the related keyways 13 and 14 of the central member 3, and the keys 10b and 11b of the side member 2b shifting similarly in the keyways 15 and 16 of the central member 3 to take up such disalignments. However, limiting the sliding engagement between the three members to short radial keyway portions positioned at maximum radial distance from the axis, makes it possible to locate with great accuracy the points of force transmission from one side member to the central member and from the latter to the other side member within the range of said maximum radial distance, thereby minimizing the objectionable angular back-lash which otherwise tends to occur in couplings of this type while facilitating machining operations through a reduction in the requisite tolerances. At the same time, as angular rigidity is increased, the inertia of the coupling assembly is reduced.

The other important difference present in the couplings of FIGS. 1 and 2 lies in the fact that the central member 3 in the improved coupling is completely free from torsional strains during operation. Upon reference to the conventional coupling of FIG. 1 it will readily be understood that the central member 3′ thereof is subjected to substantial torsional strains during operation owing to the fact that the transmission of torque between the respective side members 2a′, 2b′ and the central member is effected in two respective transverse planes axially displaced from one another on opposite sides from the transverse midplane of the member 3′, these planes being determined by the positions of the centres of pressure of the axially-displaced keyway assemblies 4a′, 5a′ and 4b′, 5b′ respectively. The twisting moments thus set up in the central member 3′ can assume rather lareg values detrimental to the accurate operation of the coupling, especially in connection with delicate servo-mechanisms.

In the improved coupling shown in FIG. 2, the points of force transmission between side member 2a and central member 3, and between the side member 2b and the central member, are all positioned in a common transverse plane, i.e. the transverse midplane of the member 3, so that torsional strains in the central member are substantially or completely eliminated. As indicated by the vector diagram in FIG. 3, the four arms or sides of the member 3 are stressed in compression and in tension only, the forces being transmitted between the four points of pressure application in straight lines in a common plane, along the sides of a square. At the same time as the central member in the coupling of the invention is relieved of all twisting strains, its thickness dimension as required for a given torque-transmitting capacity is reduced together with its inertia.

FIG. 7 illustrates a modification of the embodiment illustrated in FIG. 2, in which not only the central member 3 but also the side members 2a″ and 2b″ are free of any torsional strains in operation. The main difference between the coupling of FIG. 7 and that of FIG. 2 lies in the shape imparted to the side coupling members 2a″, 2b″ or 2a and 2b; the central member 3″ can be similar to the one shown at 3 in FIGS. 3 and 4. The tenon-supporting arms of each side member 2a″ and 2b″ have here been redesigned to exhibit flank portions 15 and 16 sloping in an axial plane, at an angle of slightly less than 45° with reference to the shaft axis A, from the pressure-transmitting tenons such as 10a″, 10b″, 11a″ to the outer hub region 6a″ and 6b″. To appreciate the further improvement thus introduced it should be realized that in the coupling of FIG 2, using the form of side members 2a and 2b illustrated in FIGS. 5 and 6, each of the side members is subjected to torsional strains during operation of the coupling. Twisting moments are generated in the arms 8a and 9a by the axial offset present between the centers of pressure of the surfaces of the torque-transmitting tenons such as 10a and 11a, and the point at which the pressures are transmitted through the taper fit 7a or 7b to the shaft 1a or 1b. A similar condition is of course also present in the conventional coupling of FIG. 1. These twisting moments are eliminated from the side members in the coupling of FIG. 7 because the sloping arms 15, 16 therein transmit the pressures from the tenons such as 10a″, 10b″, 11a″ to the hub 6a″, 6b″ along straight lines including an angle of less than 90° with the axis of the coupling. This can be better understood from a consideration of the diagram of FIG. 9, where each of the sloping arms 15, 16 is symbolized as a cantilever beam 115, 116 having one end rigidly secured to the shaft 1 and having its free end diverging away therefrom to the pressure transmitting extremities 110, 111. Moreover, each of these cantilever arms is braced at an intermediate point of its length by means of struts 17 which represent the solid flanges of the side members 2a″, 2b″ in the actual coupling of FIG. 7. Under these conditions it will be apparent that the forces applied to the tenons 10a″, 11a″ will stress the cantilever arms 15, 16 in flexion and said arms will transmit the forces to the shaft 1a without any part of the structure being subjected to torsion. As a result, the side members of the improved coupling in this embodiment will possess considerably higher rigidity and lower inertia for a given torque-transmitting capacity, it being noted that the flexional modulus of elasticity of a structural part is approximately three times as great as the torsional modulus of elasticity of the same part.

Figure 10:
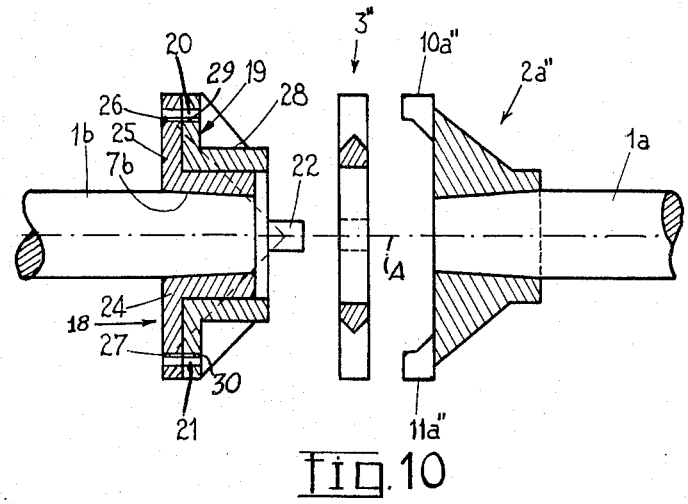
FIG. 10 is an axial sectional view, partly exploded, of a coupling device according to a further embodiment of the invention including improved torque-limiting means.
Figure 11:
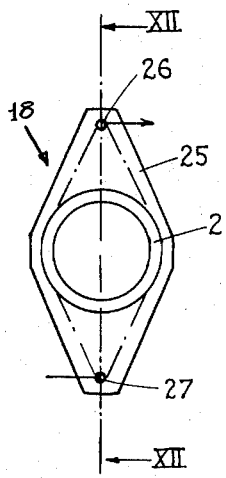
FIG. 11 is a front view of one of the two elements constituting one of the side members of the coupling of FIG. 10.
Figure 12:
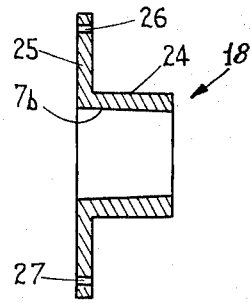
FIG. 12 is a sectional view of the element shown in FIG. 11 taken on line XII—XII of the latter figure.

In accordance with a further aspect of the invention, an improved Oldham's coupling is provided with torque-limiting means in the form of sheer elements adapted to be sheared should the torque transmitted through the coupling exceed a prescribed value. In FIG. 10, it will be seen that the coupling there shown is generally similar to that shown in FIG. 7, the central coupling member 3″ and one of the two side coupling members, i.e. member 2a″, remaining unchanged. However, the other side coupling member is here replaced by a pair of elements 18 and 19 interconnected through shear elements 20 and 21. Specifically, the element 18 (see also FIGS. 11 and 12) is in the form of a sleeve 24 having a taper bore 7b therein for force-fitted engagement around the shaft 1b and a pair of flat tapering arms or flanges 25 extending in opposite directions from one end of the sleeve and having holes 26, 27 near their outer ends. The other element 19, cooperating with element 18 in constituting a side member of the coupling includes a cylindrical sleeve portion 28 surrounding the sleeve 24 of element 18, and radial flanges engaging the flanges 25 of element 18 and formed with holes 29, 30 alignable with the holes 26, 27 in the flanges 25. Shear pins 20, 21 are insertable through the aligned holes 26, 29 and 27, 30 for positively interconnecting the two elements 18, 19 for joint rotation so long as the torque transmitted between them does not exceed the shear strength of the pins 20, 21, which are suitably calibrated for this purpose. Projecting axially from the other end of the sleeve 28 of element 19 (see also FIGS. 14 and 15) are two tenons 22, 23 (only tenon 22 is in FIG. 10) which are engageable in the corresponding notches 13" of the central coupling member 3" and correspond in function to the tenons or keys 10a", 10b", 11a" of the embodiment earlier described with reference to FIGS. 7–9.

In the operation of the coupling shown in FIG. 10, it will be evident that so long as the torque transmitted between the two shafts 1a, 1b does not exceed the shear strength of the shear pins 20, 21 the elements 18 and 19 will rotate bodily together and the coupling will operate similarly to the one shown in FIG. 7. However, should the transmitted torque exceed the shear strength of said pins, the latter are sheared in the plane of contact between the flanges of elements 18 and 19, and the element 19 is able to revolve freely with respect to element 18 and shaft 1b, so that no further torque is transmitted between the keys 22, 23 of element 19 and the central member 3", and the drive connection between the shafts 1a and 1b is interrupted.

Figure 13:
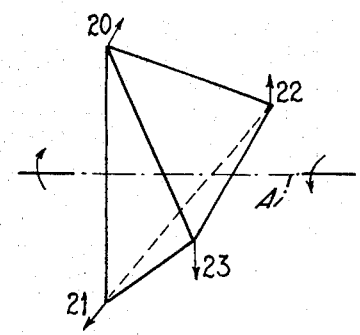
FIG. 13 is a solid diagram in perspective, illustrating the geometric relationship between the four points of force application in one of the component elements of the coupling of FIG. 10.
Figure 16:
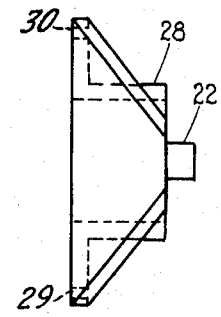
Figure 14:
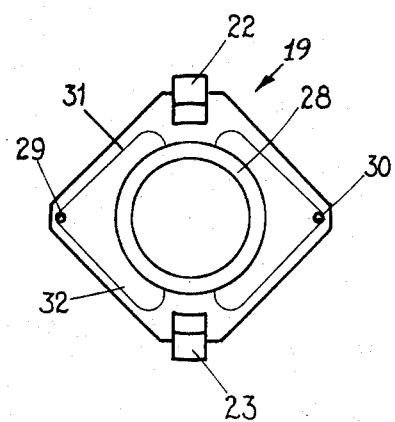
FIG. 14 is a front view of the same component element.
Figure 15:
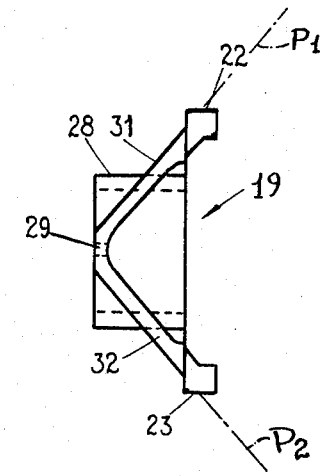
FIG. 15 is a side view of the element shown in FIG. 14.

It will be noted that the shear elements 20, 21 are suitably located at a maximum radial distance from the axis of the coupling, as shown, in order that they shall detract as little as possible from the rigidity of the coupling as a whole. In view of this consideration, coupled with the fact that the force-transmitting tenons or keys 22, 23 also are located at a maximum radial distance from the axis, I have found it advantageous in accordance with a feature of the invention to position the four elements 20, 21, 22 and 23 at the apices of an imaginary regular tetrahedron, as schematically indicated in FIG. 13 in which the directions of the forces applied to the shear pins and the tenons in operation are indicated as vectors. In the operation of the coupling, forces are transmitted form the shear pins 20, 21 to the tenons 22, 23 (assuming 1b is the drive shaft) or vice versa exclusively along the edges of the tetrahedron. Accordingly, the element 19 is formed, according to a preferred construction of this embodiment, so as to define the edges of the aforementioned tetrahedron which constitute the effective stress-transmitting parts of said element while reducing to a minimum the parts thereof that do not effectively participate in the transmission of useful forces. A form of construction satisfying these requirements is shown in FIGS. 14 to 16. It will be seen that the element 19 there shown, in addition to the cylindrical sleeve portion 28 previously mentioned, comprises a pair of generally triangular web portions 31 and 32 integrally surrounding said sleeve portion and supporting the tenons 22, 23 at the vertices of the two triangles. As clearly seen from FIGS. 14–16, the webs 31, 32 have sloping flanks which converge, in much the same manner as the flank portions 15, 16 of FIG. 7, in a direction away from the opposite coupling member toward the axial plane in which the shear-pin holes 29, 30 are located along the common base of these triangles. Thus, the flanks of the webs 31, 32 are bounded by a pair of planes $P_1$, $P_2$ which are inclined to the axis A of sleeve 28 and extend generally perpendicularly to each other so as to converge in the region of that axis at a location remote from the opposite side member 2a" (compare FIGS. 10 and 15), the same situation existing with reference to the flanks 15, 16 of member 2a" (FIGS. 7 and 10) which are bounded by inclined planes $P_3$, $P_4$ intersecting on the axis at a location remote from the opposite member 18, 19 or 2b". The pin holes 29, 30 and the tenons 22, 23 are respectively positioned at the four corners of an imaginary regular tetrahedron as mentioned above, the line interconnecting the tenons 22, 23 being axially offset from the line interconnecting the pin holes 29, 30 and both these lines being bisected by the axis A so that each pin 20, 21 (FIG. 10) is equidistant from both tenons, and vice versa. The resulting element will be stressed substantially only in compression and in tension along the edges of the tetrahedron, but will nowhere be subjected to objectionable torsion, and its rigidity will be very high while its mass and inertia will be kept to a minimum in regard to the torque transmitting capacity required.

It will be understood that various modifications and embodiments other than those shown may be conceived within the scope of the invention. As clearly set forth herein, various of the improvements disclosed can be applied independently of others, dependnig on particular requirements. The embodiments of the invention have been illustrated and described in a somewhat simplified form for reasons of clarity, and it should be understood that various more or less conventional mechanical expedients can be added to or substituted into the structures shown without departing from the spirit of the invention. Thus, while a taper force-fit of the side members of the couplings on the respective shafts is preferred over the more conventional splined engagement because of the reduction in backlash thus achievable, cylindrical fits with splines or keys may well be used. Keys or other safety blocking means may in fact be provided in addition to the taper fit shown. Means may also be provided for positively retaining the central coupling member 3 in position on disengagement of the shafts.

I claim:

1. A cross-keyed coupling interposed between a pair of substantially coaxial shafts subject to potential disalignment, comprising a pair of side members each secured to a respective shaft for rotation therewith and a central coupling disk intermediate said side members, said disk being provided with four radially extending peripheral notches spaced 90° apart; each of said side members including a hub portion secured to the respective shaft, a pair of arms rising at diametrically opposite locations from said hub portion and a pair of tenons supported on the extremities of said arms, said pair of tenons engaging in a respective diametrically opposite pair of said notches with freedom of limited radial displacement therein, said arms having sloping flank portions that terminate at said tenons and are bounded by a pair of planes inclined to the hub axis which extend generally perpendicularly to each other and intersect in the region of said axis at a location remote from the other side member, one of said side members being composed of a first part integral with said hub portion and a second part integral with said arms, said parts being mounted for relative rotation about said axis and being provided with a pair of shearable connecting elements interlinking said parts against such relative rotation at diametrically opposite points.

2. A coupling as defined in claim 1 wherein said disk has an outline composed of four concave segments interconnecting said four notches.

3. A coupling as defined in claim 1 wherein the hub portion of each side member has a frustoconical bore press-fitted onto a tapering extremity of the respective shaft.

4. A coupling as defined in claim 1 wherein the line interconnecting said diametrically opposite points extends at right angles to the line interconnecting the tenons of said one side member and is axially offset from the last-mentioned line in a direction away from said disk, said flank portions extending from the vicinity of said tenons to the vicinity of said elements.

5. A coupling as defined in claim 4 wherein said diametrically opposite points and the tenons of said one side member are located substantially at the corners of an imaginary regular tetrahedron.

6. A cross-keyed coupling interposed between a pair of substantially coaxial shafts subject to potential disalignment, comprising a pair of side members each secured to a respective shaft for rotation therewith and a central coupling disk intermediate said side members, said disk being provided with four radially extending peripheral notches spaced 90° apart; each of said side members including a hub portion secured to the respective shaft, a pair of arms rising at diametrically opposite locations from said hub portion and a pair of tenons supported on the extremities of said arms, said pair of tenons engaging in a respective diametrically opposite pair of said notches with freedom of limited radial displacement therein, one of said side members consisting of a first part integral with said hub portion and a second part integral with said arms, said parts being mounted for relative rotation about the hub axis and being provided with a pair of shearable connecting elements interlinking said parts against such relative rotation at diametrically opposite points, the tenons of said one side member and said diametrically opposite points being located substantially at the corners of an imaginary regular tetrahedron.

7. A coupling as defined in claim 6 wherein said first part has first radial flange means at the end of said hub portion remote from said disk, said second part having a sleeve surrounding said hub portion and second radial flange means adjacent said first radial flange means, said radial flange means being provided with aligned holes at said diametrically opposite points accommodating said shearable elements.

8. A coupling as defined in claim 6 wherein said arms are each divided into a pair of laterally diverging web portions with flanks extending substantially along the sides of said tetrahedron.

References Cited by the Examiner
UNITED STATES PATENTS

| | | | |
|---|---|---|---|
| 1,159,176 | 11/1915 | Cannell | 64—16 |
| 1,350,011 | 8/1920 | Du Bois | 64—31 |
| 1,352,953 | 9/1920 | Grundy | 64—31 |
| 1,705,731 | 3/1929 | Hufferd | 64—17 |
| 2,654,586 | 10/1953 | Berry | 64—27 |
| 2,680,359 | 6/1954 | Bowers | 64—28 |
| 2,913,884 | 11/1959 | Pfeifer | 64—13 |
| 3,000,577 | 9/1961 | Ferguson | 64—28 |

FOREIGN PATENTS 381,403   10/1932   Great Britain.

BROUGHTON G. DURHAM, *Primary Examiner.*
ROBERT C. RIORDON, *Examiner.*